United States Patent
Murali

(10) Patent No.: US 11,709,883 B2
(45) Date of Patent: *Jul. 25, 2023

(54) IMAGE BASED CONTENT SEARCH AND RECOMMENDATIONS

(71) Applicant: Spotify AB, Stockholm (SE)

(72) Inventor: Vidhya Murali, Jersey City, NJ (US)

(73) Assignee: Spotify AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,422

(22) Filed: Oct. 22, 2021

(65) Prior Publication Data

US 2022/0114209 A1    Apr. 14, 2022

Related U.S. Application Data

(63) Continuation of application No. 15/974,349, filed on May 8, 2018, now Pat. No. 11,182,424.

(51) Int. Cl.
| | |
|---|---|
| *G06F 16/583* | (2019.01) |
| *G06F 16/68* | (2019.01) |
| *G06F 16/56* | (2019.01) |
| *G06F 16/638* | (2019.01) |
| *G06F 16/58* | (2019.01) |
| *G06N 3/08* | (2023.01) |

(Continued)

(52) U.S. Cl.
CPC .......... *G06F 16/583* (2019.01); *G06F 16/56* (2019.01); *G06F 16/5866* (2019.01); *G06F 16/639* (2019.01); *G06F 16/68* (2019.01); *G06N 3/04* (2013.01); *G06N 3/08* (2013.01); *G06V 10/764* (2022.01); *G06V 10/82* (2022.01); *G06F 18/214* (2023.01); *G06F 18/22* (2023.01); *G06F 18/2411* (2023.01); *G06V 2201/10* (2022.01)

(58) Field of Classification Search
CPC ......... G06F 16/68; G06F 16/56; G06F 16/639
See application file for complete search history.

(56) References Cited

U.S. PATENT DOCUMENTS

| | | |
|---|---|---|
| 8,200,025 B2 | 6/2012 | Woodbeck |
| 8,452,088 B1 | 5/2013 | De Ponti |
| 9,626,436 B2 | 4/2017 | Roger |
| 9,723,369 B2 | 8/2017 | Kim |

(Continued)

OTHER PUBLICATIONS

"Distance and Similarity Coefficients", Available Online at: http://paleo.cortland.edu/class/stats/documents/11_Similarity (last accessed May 4, 2018).

(Continued)

*Primary Examiner* — Dangelino N Gortayo
(74) *Attorney, Agent, or Firm* — Merchant & Gould P.C.

(57) ABSTRACT

A system, method and computer program product for accessing content based on an image. The method comprises comparing an image to a database of images, each of the images of the database being associated with at least one corresponding audio track, identifying those ones images of the database that correspond to the image, and identifying the at least one corresponding audio track that corresponds to the identified images. In one example aspect, the method also comprises presenting the audio track to a user. Corresponding metadata also can be presented. The images may be classified by, e.g., genre, musical album, concept, or the like, and, in cases where an input image is determined to belong to any such classes, audio content and/or metadata relating thereto are identified and presented to the user.

21 Claims, 4 Drawing Sheets

(51) Int. Cl.
*G06N 3/04* (2023.01)
*G06V 10/764* (2022.01)
*G06V 10/82* (2022.01)
*G06F 18/22* (2023.01)
*G06F 18/214* (2023.01)
*G06F 18/2411* (2023.01)

(56) References Cited

U.S. PATENT DOCUMENTS

| | | | |
|---|---|---|---|
| 9,743,033 B2* | 8/2017 | Kim | G11B 27/28 |
| 9,830,526 B1 | 11/2017 | Lin | |
| 10,140,515 B1* | 11/2018 | Waldo | G06F 16/686 |
| 10,872,115 B2* | 12/2020 | Agrawal | G06F 16/5866 |
| 11,182,424 B2 | 11/2021 | Murali | |
| 2008/0256100 A1 | 10/2008 | van de Sluis | |
| 2010/0070057 A1 | 3/2010 | Sugiyama | |
| 2011/0113331 A1 | 5/2011 | Herberger | |
| 2011/0225153 A1* | 9/2011 | Haseyama | G11B 27/34 707/E17.061 |
| 2012/0098946 A1* | 4/2012 | Seung | H04N 21/43072 348/61 |
| 2012/0301032 A1 | 11/2012 | Kawanishi | |
| 2012/0323914 A1 | 12/2012 | Rothschild | |
| 2013/0205243 A1 | 8/2013 | Rivera | |
| 2014/0040262 A1 | 2/2014 | Winter | |
| 2014/0063317 A1* | 3/2014 | Jung | G06F 16/58 348/333.02 |
| 2015/0120720 A1 | 4/2015 | Dhara | |
| 2017/0228616 A1 | 8/2017 | Tasdizen | |
| 2018/0025215 A1* | 1/2018 | Yousef | G06F 16/58 382/118 |
| 2018/0052908 A1 | 2/2018 | Liu | |
| 2019/0163766 A1 | 5/2019 | Gulati | |
| 2020/0097742 A1 | 3/2020 | Ratnesh Kumar | |
| 2020/0226421 A1 | 7/2020 | Almazan | |
| 2020/0410298 A1 | 12/2020 | Murali | |

OTHER PUBLICATIONS

Apple Inc., "Creating an Image Classifier Model," Apple Developer, 2018. Available at: https://developer.apple.com/documentation/createml/creating_an_image_classifier_model.

Bernhardsson, Erik, "Music recommendations using cover images (part 1)". Available Online at: https://erikbern.com/2014/04/01/music-recommendations-using-cover-images-part—1.html (2014).

Bernhardsson, Erik, "Nearest neighbors and vector model—part 2—algorithms and data structures". Available Online at: https://erikbern.com/2015/10/01/nearest-neighbors-and-vector-models-part—2-how-to-search-in-high-dimensional-spaces.html (2015).

Brochu et al., "The Sounds of an Album Cover: Probabilistic Multimedia and IR" (2002).

Deal, Allison, "Visual Shazam with Album Covers," Medium, May 8, 2017. Available at: https://medium.com/@_shiftseven/visual-shazam-hack-7a822bf44d80.

Gandhi, Rohith, "R-CNN, Fast R-CNN, Faster R-CNN, YOLO—Object Detection Algorithms", Towards Data Science, Jul. 9, 2018, appearing at https://towardsdatascience.com/r-cnn-fast-r-cnn-faster-r-cnn-yolo-object—detection-algorithms-36d53571365e.

Ghandi, Rohith, "Support Vector Machine—Introduction to Machine Learning Algorithms (SVM Model by Scratch)", Towards Data Science, Jul. 7, 2018, appearing at https://towardsdatascience.com/support-vector-machine-introduction-to-machine-learning-algorithms-934a444fca47.

Girshick, Ross, "Fast R-CNN", The IEEE International Conference on Computer Vision (ICCV), 2015, pp. 1440-1448.

Girshick, Ross, et al., "Rich feature hierarchies for accurate object detection and semantic segmentation", The IEEE Conference on Computer Vision and Pattern Recognition (CVPR), 2014, pp. 580-587.

He et al., "Deep Residual Learning for Image Recognition", 2016 IEEE Conference on Computer Vision and Pattern Recognition (CVPR), pp. 770-778 (Jun. 2016).

Locklear, Mallory, "'Record Player' app. searches Spotify when you snap a pic of an album," Engadget, May 4, 2018. Available at: https://www.engadget.com/2018/05/04/record-player-app-image-based-spotify-search/.

Maine, Samantha, "This app is like Shazam but for album covers," NME, May 2, 2018. Available at: https://www.nme.com/news/music/app-album-cover-shazam-2306795, 12 pages.

Pascal et al., "Extracting and Composing Robust Features with Denoising Autoencoders", ICML '08 Proc. of the 25th Int. Conference on Machine Learning, pp. 1096-1103 (2008).

Redmon, J. et al., "YOLO9000: Better, Faster, Stronger", The IEEE Conference on Computer Vision and Pattern Recognition (CVPR), 2017, pp. 7263-7271.

Redmon, J. et al., You Only Look Once: Unified, Real-Time Object Detection, The IEEE Conference on Computer Vision and Pattern Recognition (CVPR), 2016, pp. 779-788.

Ren, S. et al., "Faster R-CNN: Towards Real-Time Object Detection with Region Proposal Networks", IEEE Transactions on Pattern Analysis and Machine Intelligence, vol. 39, Issue: 6 (2017), pp. 1137-1149.

Schroff et al., "FaceNet: A Unified Embedding for Face Recognition and Clustering", Proceedings of the 2015 IEEE Conference on Computer Vision and Pattern Recognition (CVPR), pp. 815-823 (2015).

Schultz et al., "Learning a Distance Metric from Relative Comparisons", NIPS'03 Proceedings of the 16th International Conference on Neural Information Processing Systems, pp. 41-48 (2003).

Uijlings, J.R.R. et al., "Selective Search for Object Recognition", International Journal of Computer Vision Sep. 2013, vol. 104, Issue 2, pp. 154-171.

Weaver, Patrick, "Record Player" (2018). Available at: https://record-player.glitch.me/auth.

Weinberger et al., "Distance Metric Learning for Large Margin Nearest Neighbor Classification", Journal of Machine Learning Research 10, pp. 207-244 (2009).

* cited by examiner

IMAGE BASED CONTENT SEARCH AND RECOMMENDATIONS

CROSS-REFERENCE TO RELATED APPLICATION

This application is a continuation of U.S. application Ser. No. 15/974,349, filed on May 8, 2018, entitled IMAGE BASED CONTENT SEARCH AND RECOMMENDATIONS, the disclosure of which is hereby incorporated by reference in its entirety. To the extent appropriate a claim of priority is made to each of the above-disclosed application.

APPENDIX

This patent application includes the following Appendices [1] to [3].

Appendix [1]: "Nearest Neighbors and vector models part—2—algorithms and data structures", by Erik Bernhardsson (2015), found at erikbern.com (last accessed May 4, 2018).

Appendix [2]: "Nearest Neighbour Algorithm", found at Wikipedia.org (last accessed May 4, 2018).

Appendix [3]: "Distance and Similarity Coefficients", found at paleo.cortland.edu (last accessed May 4, 2018).

The content of each Appendix [1] to [3] is incorporated by reference herein in its entirety, as if set forth fully herein.

BACKGROUND

Prior work can identify music, movies, advertising, and television shows based on audio samples obtained using a microphone and software. For example, an individual may hear a song that appeals to him/her, but may not be familiar with the name of the song, the musical artist, the album name, and the like. If interested in learning that information, the user can employ known software, such as Shazam, to automatically identify the applicable information based on an audio sample of the song. However, there is no known technique for being able to automatically identify and retrieve music or metadata associated with a song, genre, instruments, artist in the song, and the like, based on an image. For example, an individual may be interested in searching for a digital version of an album based on an image of the album cover art of the physical CD or record. Additionally the individual may also be interested in searching for the digital version of music performed by a particular artist based on the artist image from a live concert or merchandise such as posters, T-Shirts, etc. An individual may also be interested in searching for music by context or genres such as instrumental music using just a picture of a guitar or violin or a zen garden as conceptual input for the retrieving relevant music. It would be useful to provide a mechanism for enabling a user to achieve these objectives.

It is with respect to these and other general considerations that embodiments have been described. Also, although relatively specific problems have been discussed, it should be understood that the embodiments should not be limited to solving the specific problems identified in the background.

SUMMARY

The foregoing and other limitations are overcome by a system, method and computer product for accessing content based on an input image. In one example embodiment herein, the method comprises comparing an image to a database of images, each of the images of the database being associated with at least one corresponding audio track, identifying those ones images of the database that correspond to the image, and identifying the at least one corresponding audio track that corresponds to the identified images.

According to another example aspect herein, the comparing includes performing one of a nearest neighbor procedure, a vector space measurement, or a triplet loss function procedure.

The method also can comprise, according to one example embodiment herein, one or more of playing back the at least corresponding audio track, and generating a recommendation playlist based on a result of identifying the at least one corresponding audio track. The method can further detect a musical category based on the identified images.

In another example aspect herein, the method further comprises extracting feature vectors from the image and the images of the database, wherein the extracting is performed by one of a convolutional neural network and an autoencoder.

In still another example embodiment herein, the method further comprises identifying metadata that corresponds to the identified images, and presenting the metadata to the user.

Preferably, the classifier is a fine tuned pre-trained model (also referred to as a "trained model" or "trained classifier") based on the images from the database, wherein the training trains the classifier to classify at least some of the images from the database into predetermined classifications, such as, by example and without limitation, classifications by musical album, genre, concept, artist, composer, or the like.

In still a further example embodiment herein, a method is provided that comprises classifying an image into a predetermined classification, accessing content associated with the predetermined classification, and presenting the content to a user, wherein the content includes at least one of an audio track and metadata.

DETAILED DESCRIPTION

Figure 1:
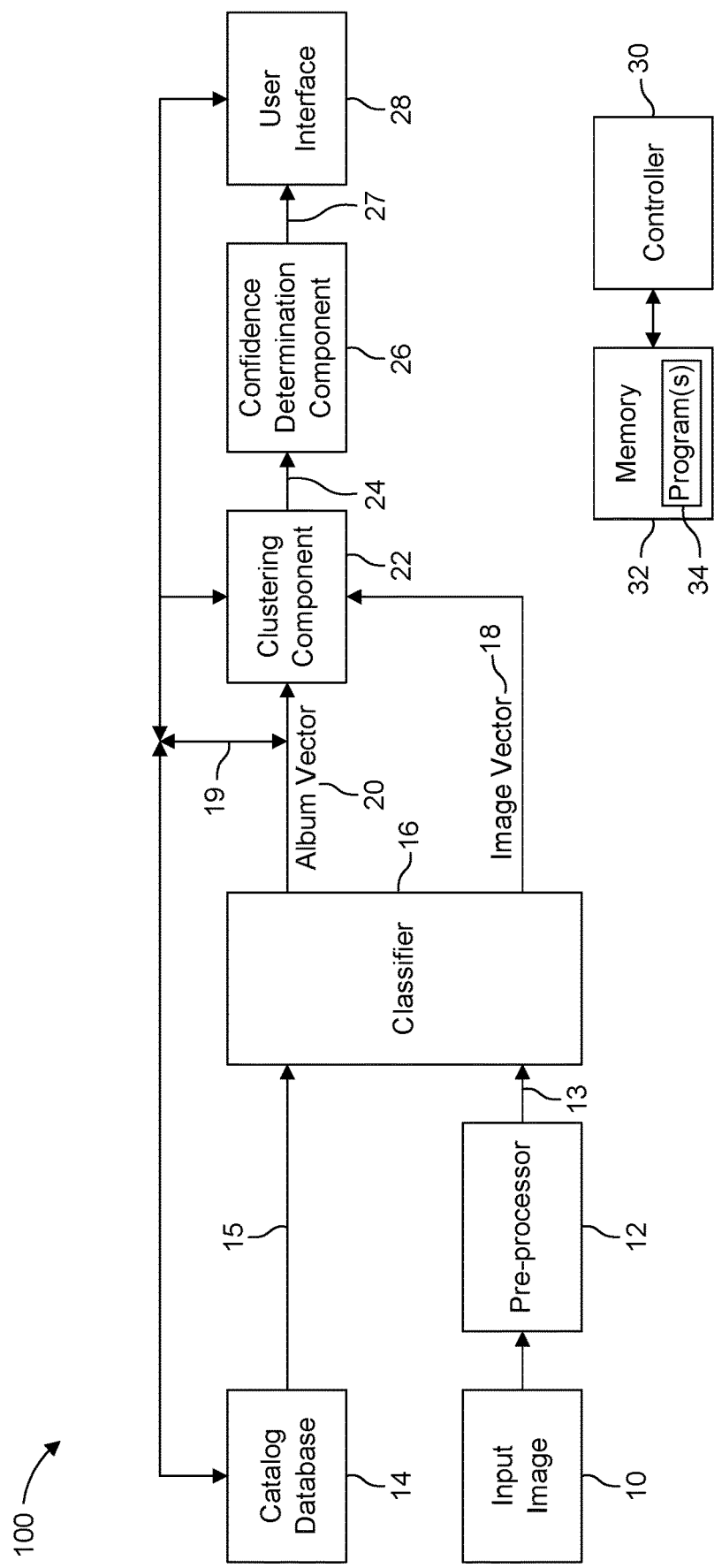
FIG. 1 shows an example of a system 100 according to an example embodiment herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present technology involves systems, devices, methods, and computer programs that enable a user to access content, such as, for example and without limitation, metadata and/or audio (e.g., musical or non-musical) content or other content, based on an image. Examples of musical content may include content such as, by example and without limitation, albums, tracks, artists, etc. An example method according to one embodiment herein comprises extracting an image feature vector (referred to for convenience as a "query image vector") from a captured image. The captured image may include content such as, for example and without limitation, album cover art of a musical album, cassette tape, CD, the actual CD, tape, or vinyl record itself, text, musical instruments, merchandise such as a T-shirt, a logo, art, poster, or an individual or group of individuals such as musical artists, etc. In one example embodiment herein, the image feature vector is obtained by applying the captured image to a trained classifier that includes a convolutional neural network (CNN), or, in another example embodiment, an autoencoder. A database includes catalogues of, for example, images associated with musical albums or tracks, such as album cover art, images associated with the tracks, and the like. Image vectors (referred to herein for convenience as "album vectors") are extracted from these images from the database using the classifier. An algorithm is employed using the query image vector and the album vectors to identify those ones of the album vectors that are substantially similar to the query image vector. In one example embodiment, the algorithm is a nearest neighbor algorithm involving an Annoy tree, although in other examples other types of procedures can be employed such as a triplet loss procedure. The top K results (i.e., best matches) can be presented to a user and the corresponding audio tracks and/or metadata can be presented/played as well, either automatically or in response to user selection. Some example embodiments herein can automatically generate recommendation playlists based on captured input images, mine metadata about album tracks based on such images, and detect musical categories (e.g., devotional music, instrumental music, etc.) based on the images.

EXAMPLE SYSTEM

A system 100 for performing searching and recommendation of content based on an input image, according to an example embodiment herein, will now be described, with reference to FIG. 1. The system 100 can be controlled by a controller 30 that operates under the control of one or more programs 34 stored in a memory 23, to control the overall operations and components of the system 100. Although not shown explicitly in FIG. 1 for convenience, the controller 30 may be connected to each of the various other components (in addition to memory 32) of the system 100 shown in FIG. 1. The program(s) 34 can include instructions for performing various procedures herein, such as, by example and without limitation, those shown in FIGS. 3 and 5.

The system 100 can be used by a user to, for example, obtain access to content relating to a captured image 10 (also referred to herein as "captured input image 10", "input image 10", and "image 10"). For example, the user may desire to obtain metadata about and/or listen to one or more musical tracks of a musical album. As such, by way of one illustrative example, the user can capture an image of the cover art of the album or other related content, and input it into the system 100 as input image 10, wherein, in response to image 10 being inputted, the desired content is automatically retrieved and presented to the user in the manner to be described below. In another example scenario, the user may hear music that appeals to the user at a concert, but may not be familiar with the name of the song, an album on which the song appears, and/or the user may wish to access a digital version of the song. As such, the user may capture an image of the artist performing the song, an image of a T shirt or album cover art or other merchandise relating to the artist or music, or the like, and input it into the system 100 as input image 10, wherein, in response to image 10 being inputted, the desired content is automatically retrieved and presented to the user in a manner as will described below. Of course, the above examples are illustrative in nature, and the scope of the invention should not be construed as being necessarily limited thereto. There may be many other example scenarios for capturing content to be provided as the input image 10, and the captured image 10 may include any applicable content. By way of example and without limitation, the content of the captured image 10 may include cover art of a vinyl record, cassette tape, CD, the actual CD, tape, or a vinyl record itself, text, musical instruments, merchandise such as a T-shirt, a logo, art, poster, or an individual or group of individuals such as musical artists, concepts (e.g., Japanese gardens, a violin, guitar or other musical instrument, a dog, waterfall, etc.) or any other subject matter. Also, the image 10 may be, for example and without limitation, a two-dimensional image, such as a photograph or screen display, although in other embodiments the image may be three-dimensional, such as a statue or hologram. The image may be captured by an optical device (not shown) such as a camera, mirror, lens, telescope, microscope, or another type of image capturing device (not shown).

Referring again to FIG. 1, the captured image 10 is applied to a pre-processor (also referred to herein as an "image pre-processor") 12. Various types of processing may be performed by the pre-processor 12 such as, for example and without limitation, suppressing unwanted distortions or enhancement of image features important for further processing, and transforming the image 10 into a predetermined format, such as, e.g., a 300×300 pixel image. The image pre-processor 12 performs the image processing to the image 10, and a resulting processed image 13 is outputted and provided to the classifier 16, where the image 13 is processed as will be described below.

Figure 4:
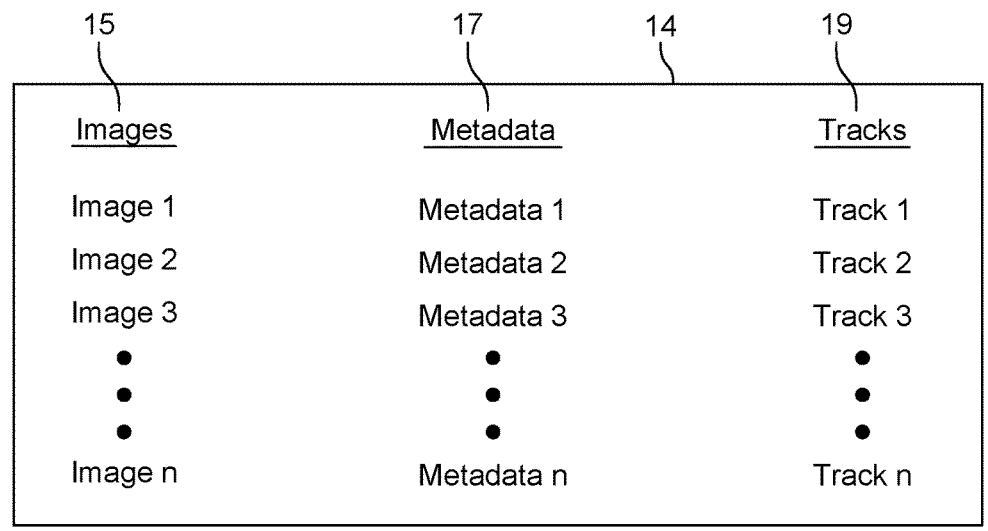
FIG. 4 shows a database 14 used in the system 100 of FIG. 1, according to an example embodiment herein.

Referring now to database 14 shown in FIG. 1 and further represented in FIG. 4, the database 14 stores catalogues of, for example and without limitation, images 15 of, or associated with, content such as musical album cover art, a cover of a vinyl record, cassette tape, CD, the actual CD, tape, or vinyl record itself, text, musical instruments, merchandise such as a T-shirt, a logo, art, poster, or an individual or group of individuals such as musical artists, and the like. In one example embodiment herein, the images 15 stored in the database 14 have a predetermined format, and are 300×300 pixel images, although this example is non-limiting. Also in one example embodiment, the database 14 is a proprietary database maintained by an entity, such as Spotify.

Also in one example embodiment herein, the database 14 stores music tracks 19 and metadata 17 associated with the images 15 (FIG. 4). For example, for images 15 stored in database 14 such as album cover art or other images associated with a musical album, the images may also have at least one audio track (e.g., musical or other tracks) 19 from the corresponding album stored in association with the at least one musical track, and also metadata 17 stored in association therewith. The metadata 17 may include, by example and without limitation, album liner notes, track titles, authors, composers, track durations, genres, and any other suitable type of text or other information related to the album. Of course, although the foregoing example is given in the context of a musical album, the scope of the invention is not limited only thereto, and also applies with respect to any types of images besides album cover art, and also for single musical tracks, non-musical tracks, and/or any type or quantity of audio information and associated images and/or metadata.

Also shown in FIG. 1 is the classifier 16. In one example embodiment, the classifier 16 is pre-trained based on images 15 from the database 14 to classify the images 15 in a predetermined manner. Image vectors (referred to herein for convenience as "album vectors") 20 are extracted by the classifier 16 from the images 15. The vectors 20 may include, for example, a color histogram or summary image corresponding to respective images 15, and can represent the images 15 as being classified within a particular classification (after pre-training is performed, in a manner to be described below).

In one example embodiment herein, the classifier 16 comprises a convolutional neural network (CNN) trained using deep learning to perform predetermined classifications. As known in the art, a CNN can be used for machine learning, and employs a class of deep, feed-forward artificial neural networks that can be used to analyze and classify images. In one example embodiment herein, the CNN includes 101 layers (although this example is not limiting or exclusive) and weights of the CNN are adjusted during training in order to minimize classification errors. One example type of CNN that can be employed by the classifier 16 is described in a publication by Kaiming He et al., entitled "Deep Residual Learning for Image Recognition", 2016 IEEE Conference on Computer Vision and Pattern Recognition (CVPR), pp. 770-778, June 2016, which publication is incorporated by reference as if set forth fully herein, although other suitable types may be used instead. The Kaiming He et al. publication describes a residual learning framework to ease training of networks. Layers are reformulated as learning residual functions with reference to layer inputs, instead of learning unreferenced functions. In one example network architecture described in that publication, convolutional layers have 3×3 filters and follow rules such as: (i) for a same output feature map size, the layers have the same number of filters; and (ii) if the feature map size is halved, the number of filters is doubled. Downsampling is performed directly by convolutional layers having a stride of 2, and the network ends with a global average pooling layer and a 1000-way fully-connected layer with softmax (page 772). According to the publication, for residual networks, shortcut connections are inserted to turn the network into a residual counterpart version. The shortcut still performs identify mapping, with extra zero entries padded for increased dimensions, or a projection shortcut is used to match dimensions (1×1 convolutions). In one implementation described in the publication, batch normalization is used after each convolution and before activation, weights are initialized and all plain/residual nets are trained. A learning rate starts from 0.1 and is divided by 10 when an error plateaus, and models are trained for a predetermined number of iterations. A weight decay of 0.0001 and a momentum of 0.9 can be employed (page 773).

In an alternative example embodiment herein, the classifier 16 includes an autoencoder that converts images 15 to corresponding image vectors 20 that are reconstructed or encoded representations of the images 15, with a reduced dimensionality. As known in the art, an autoencoder is an artificial neural network that learns efficient codings in an unsupervised manner. One example type of encoder that can be employed by the classifier 16 is described in a publication by Pascal Vincent et al., entitled "Extracting and Composing Robust Features with Denoising Autoencoders", ICML '08 Proc. Of the $25^{th}$ Int. Conference on Machine Learning, pp. 1096-1103 (2008), which is incorporated by reference herein in its entirety as if set forth fully herein, although other suitable types may be used instead. As described in the Vincent et al. publication, an autoencoder takes an input vector and maps it to a hidden representation through a deterministic mapping, involving a weight matrix and a bias vector. A resulting latent representation is then mapped back to a "reconstructed" vector in an input space, and the weight matrix of the reverse mapping may be optionally constrained. Each training is accordingly mapped to a corresponding representation and reconstruction. Model parameters are optimized to minimize an average reconstruction error.

It should be noted that formation of the vectors 20 may occur during pre-training of the classifier 16, and the vectors 20 may be stored (e.g., in classifier 16, database 14 via connection 35, or a separate memory such as memory 32) for use in a subsequent comparison to be made by clustering component 22, although this example is not limiting. One example embodiment for pre-training the classifier 16 will now be described, with reference to FIGS. 2 and 3.

Sampling of Positive and Negative Observations

According to an example aspect herein, learning is framed as a classification task, wherein one or more classifications can be learned. For example, it may be desired to train the classifier 16 to learn one or more images having content such as album cover art or other content, as being associated with a class of a particular type. By example and without limitation, the class type may include one or more of a particular musical album, track(s), artist(s), musical genre, concept, or the like. In other examples, it may be desired to train the classifier 16 to learn one or more images having content such as cover art of a vinyl record, a cassette tape, a CD, a vinyl record itself, text, musical instruments, concepts, or the like, as being associated with a particular class, such as, for example, a class that includes one or more of a musical album, track(s), artist(s), musical genre (e.g., devotional music, classical music, rock music, world music, etc.), movie score(s), concept(s), instrumental music, vocal music, or the like. In still other examples, it may be desired to train the classifier 16 to learn one or more images of merchandise such as a T-shirt, a logo, art, poster, or an individual or group of individuals such as musical artists or composers, or any images associated with musical songs or tracks, as being associated with a particular class, wherein the class includes, by example and without limitation, one or more of a particular musical album, track(s), artist(s), musical genre(s), concept(s), or the like. In one example embodiment herein, there are one thousand classifications. Of course, the foregoing examples are non-limiting and non-exclusive, and there may be many other types of image content employed and many types and numbers of classifications learned, depending on applicable operating criteria.

Figure 2:
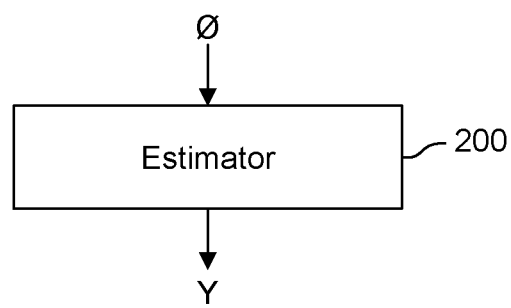
FIG. 2 shows an example estimator used in a training procedure, according to an example aspect herein.
Figure 3:
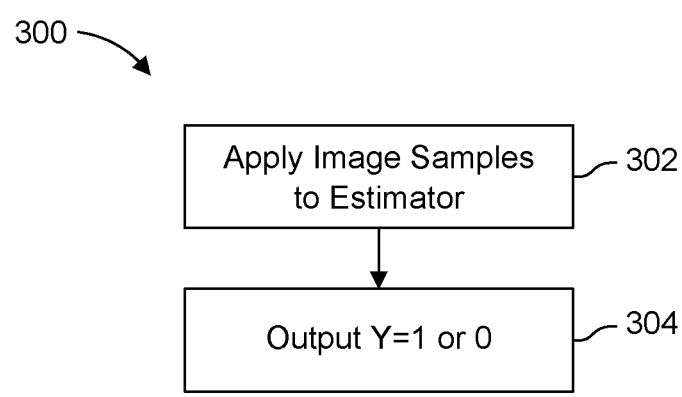
FIG. 3 is a flow diagram of the training procedure, according to an example embodiment herein.

A procedure 300 for sampling positive and negative observations according to an example embodiment herein will now be described, with reference to FIG. 3, which illustrates a flow diagram of the procedure 300, and also with reference to FIG. 2, which shows an estimator 200 according to an example embodiment herein, wherein the estimator 200 may further represent classifier 16 of FIG. 1 during pre-training thereof. The estimator 200, in one example embodiment herein, is fed with a signal φ (e.g., a signal representing an image 15), and the estimator 200 assigns each observation to either a predetermined class or a non-class. The estimator 200 preferably has a known bias, and the signal φ is employed to train the estimator 200, such that the estimator 200 outputs a value Y that equals "1" in a case where the signal φ includes an image from the predetermined class, or a value Y that equals "0" in a case where the signal φ does not include an image from the predetermined class. That is, the estimator 200 with a known (uniform) bias is trained in by sampling positive (Y=1) and negative (Y=0) observations from image signals φ (i.e., signals representing images 15). More particularly, samples of the signal φ are applied to the estimator 200 (step 302), which responds by outputting (in step 304) a value Y that equals either '1' or '0', wherein negative (Y=0) fragments of the signal are drawn uniformly from non-predetermined class images, while positive observations are sampled proportionally to signals φ with images in the predetermined class.

Example scenarios of the manner in which the estimator 200 may be trained will now be described. It should be appreciated, however, that the following examples are for purposes of illustration only, and the scope of the invention should not be construed as being necessarily limited only thereto. In one example scenario, it is assumed that it is desired to train the estimator 200 to learn at least one image associated with a particular musical album, such as Abbey Road by the Beatles. As such, signals φ may be applied (in step 302) to the estimator 200 that include images having content such as, for example, cover art of the album, sleeve, vinyl or CD, or other content known to be associated with Abbey Road, to train the estimator 200 to learn those images as being associated with the album. Other images signals φ that are unrelated to the album also can be applied (in step 302) to train the estimator 200 to identify images not in the classification. The estimator 200 is trained such that the estimator 200 responds by outputting (in step 304) a value Y that equals either '1' for positive cases where images having content related to Abbey Road are applied to the estimator 200, or a value of Y that equals '0' for negative cases where images having content unrelated to Abbey Road are applied to the estimator 200. Values for positive determinations may be stored, such as an estimator 200, the database 14 or in a separate memory, such as memory 32.

In another example scenario, it is assumed that it is desired to train the estimator 200 to learn at least one image as being associated with a particular musical genre, such as heavy metal. As such, signals φ may be applied (in step 302) to the estimator 200 that include images having content such as, for example, cover art of heavy metal albums, heavy metal artists, and/or any other content known to be associated with the heavy metal genre, to train the estimator 200 to learn those images as being associated with the genre. Other images signals φ that are unrelated to the album also can be applied (in step 302) to train the estimator 200 to identify images not in that classification/genre. Again, the estimator 200 is trained such that the estimator 200 responds by outputting (in step 304) a value Y that equals either '1' for positive cases where images having content related to heavy metal are applied to the estimator 200, or a value of Y that equals '0' for negative cases where images having content unrelated to heavy metal are applied to the estimator 200. Values for positive determinations may be stored, such as an estimator 200, the database 14 or in a separate memory, such as memory 32.

In the foregoing manners, the estimator 200 is trained to classify images according to predetermined classifications. As mentioned above, output values Y corresponding to image signals φ within the predetermined classifications can be stored, such as in, e.g., database 14, the estimator 200/classifier 16, or in a separate memory, such as memory 32. Values for positive determinations may include a color histogram or summary image, deemed to be in a particular classification (i.e., deemed to represent a value where Y=1), and are further represented as vectors 20 in FIG. 1. In one example embodiment, stored versions of those values can be employed for being compared with an input image by a clustering component 22, during real-time application of the system 100, as will now be described.

Real-Time Application

Figure 5:
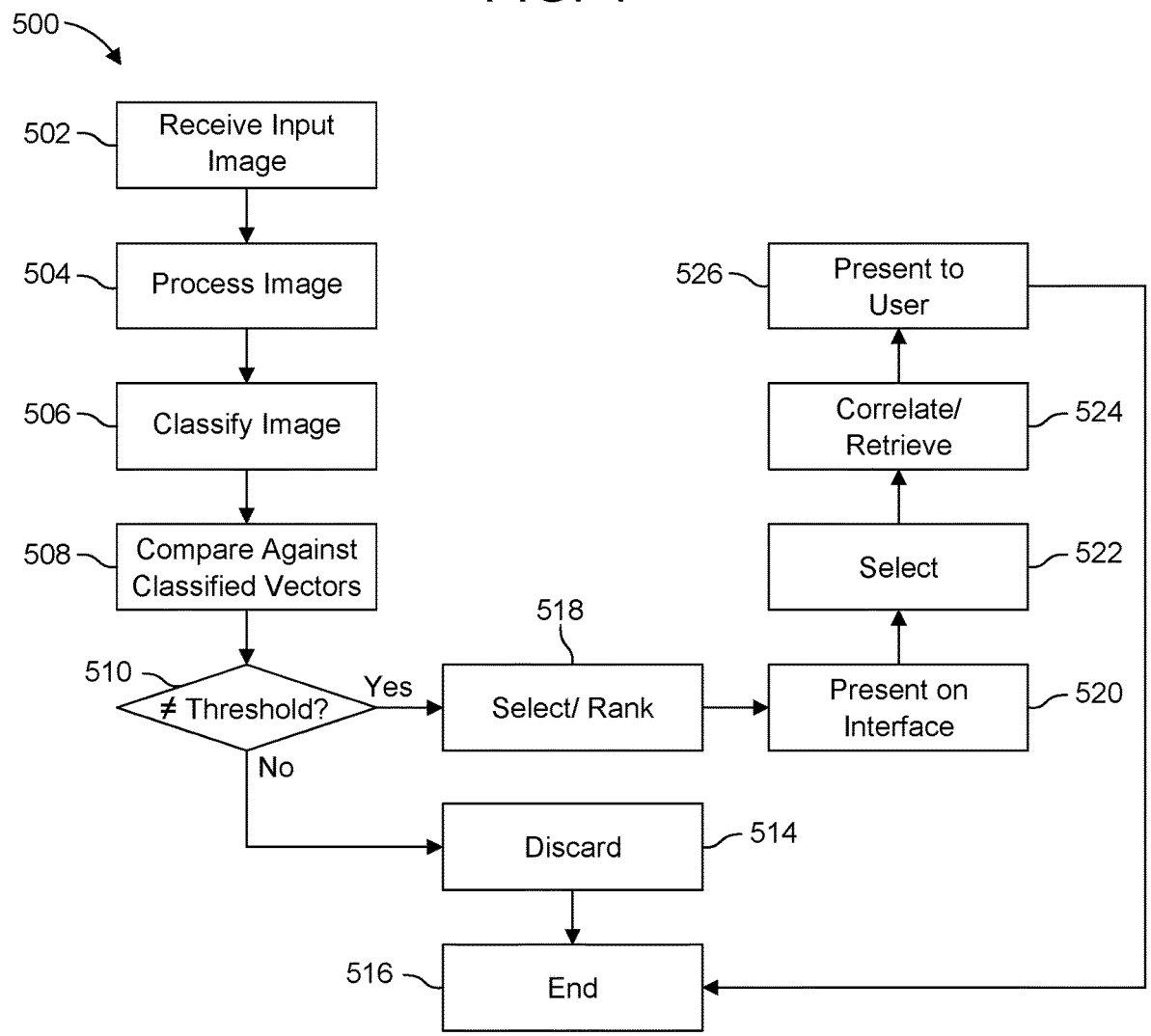
FIG. 5 is a flow diagram of a procedure for accessing content based on an input image, according to an example aspect herein.

Referring again to FIG. 1 in conjunction with FIG. 5, the manner in which the system 10 operates to access content based on a captured input image 10 will now be described. In one example scenario, the image 10 may be received from a user (step 500), and includes an image of cover art of a musical album cover, such as, e.g., Abbey Road by the Beatles. The user may desire to listen to the album, and instructs the system 100 to access content (e.g., metadata and/or audio tracks) related to the album by inputting the image 10.

As described above, the captured image 10 is applied to pre-processor 12 where it is processed in the manner described above (step 504), and a resulting processed image 13 is outputted and provided to the classifier 16. In response to processed image 13 being applied to the classifier 16, the classifier 16 classifies the image 13 (step 506) based on the pre-training of the classifier 16 (e.g., in a similar manner as described above with respect to FIG. 3), and outputs a resulting image vector 18 (also referred to herein as a "query image vector" or "image vector"). For example, the image vector 18 may include a color histogram or summary image (such as, e.g., one having higher level concepts in the image) corresponding to image 13, and may represent whether or not the input image 10 belongs to a particular classification, such as one or more classifications predetermined during training of the classifier 16. The image vector 18 is then compared against one or more vectors 20 (step 508) to determine whether they are similar based on predetermined criteria. The comparison is performed by a clustering component 22.

In one example embodiment herein, clustering component 22 employs the vectors 18 and 20 in a predetermined algorithm in step 508 to compare the vectors 18 and 20 to determine whether they are similar based on predetermined criteria. The vector 18 may be compared against a plurality of the vectors 20, wherein each vector 20 represents a particular classification, to determine/confirm whether the vector 18 (and its corresponding input image 10) belongs to at least one of the classifications, such as, for example, a classification for the Abbey Road album, and/or any other classifications. The vectors 20, as described above, may be obtained by clustering component 22 from one or more of the classifier 16, database 14, or a separate memory such as memory 32.

In one example embodiment, the algorithm employed by clustering component 22 is that used in Annoy (Approximate Nearest Neighbors Oh Yeah) to find a nearest neighbor to image vector 18, from among the vectors 20. An Annoy tree is a library with bindings for searching for points in space close to a particular query point. The Annoy tree can form file-based data structures that can be mapped into memory so that various processes may share the same data. An example of an approximate nearest neighbor algorithm that may be used for clustering component 22 are described in a publication entitled "Nearest Neighbors and vector models—part 2—algorithms and data structures", by Erik Bernhardsson (2015), found at Appendix [1], which is incorporated by reference herein in their entirety as if set forth fully herein, although this example is non-limiting and non-exclusive. In one example, as described in Appendix [1], an Anny algorithm builds up binary trees, wherein for each tree, all points are split recursively by random hyperplanes. A root of each tree is inserted into a priority queue. All trees are searched using the priority queue, until there are search_k candidates. Duplicate candidates are removed, a distance to candidates is computed, candidates are sorted by distance, and then top ones are returned to.

In general, a nearest neighbor algorithm involves steps such as: (a) start on an arbitrary vertex as a current vertex, (b) find out a shortest edge connecting the current vertex with an unvisited vertex V, (c) set the current vertex to V, (d) mark V as visited, and (e) if all the vertices in domain are visited, then terminate. The sequence of the visited vertices is the output of the algorithm. See, e.g., "Nearest neighbor algorithm" found at Appendix [2], which is incorporated by reference herein in its entirety as if set forth fully herein, and which describes one example of a nearest neighbor procedure that can be employed herein, although that example is non-exclusive.

In another example embodiment herein, the algorithm employed by the clustering component 22 is a vector space algorithm that measures the similarity between the vectors 18 and 20 in space. For example, the measurement may be a euclidean or cosine similarity measurement, although these examples are non-exclusive. In one example where a cosine similarity measurement is employed, vectors having a same orientation have a cosine similarity of 1, vectors at 90° with respect to one another have a similarity of 0, and vectors having an opposite orientation (i.e., diametrically opposed) have a similarity of −1. An example of distance and similarity measures that can be employed in the vector space algorithm is described in a publication entitled "Distance and Similarity Coefficients", found at Appendix [3], which is incorporated by reference herein in its entirety, as if set forth fully herein, although this example is not exclusive.

In another example embodiment herein, other types of techniques can be employed by the clustering component 22 in lieu of an Annoy technique or a vector space measurement, such as, by example and without limitation, a triplet loss procedure. A triplet loss procedure minimizes a distance between an anchor and a positive having the same identity, while maximizing a distance between an anchor and a negative having a different identity. In the present example embodiment, the triplet loss procedure minimizes the distance between the vectors 18 and 20 for cases where they represent substantially a same image/content, and maximizes the distance between the vectors 18 and 20 for cases where they represent different images/content from one another. Examples of a triplet loss procedure that can be employed herein are described by (1) Florian Schroff et al., entitled "FaceNet: A Unified Embedding for Face Recognition and Clustering", Proceedings of the 2015 IEEE Conference on Computer Vision and Pattern Recognition (CVPR), pp. 815-823, 2015, (2) Kilian Weinberger et al., entitled "Distance Metric Learning for Large Margin Nearest Neighbor Classification", Journal of Machine Learning Research 10, pp. 207-244, 2009, and (3) Matthew Schultz et al., entitled "Learning a Distance Metric from Relative Comparisons", NIPS'03 Proceedings of the 16th International Conference on Neural Information Processing Systems, pp. 41-48 (2003). Each of those publications (1), (2), and (3) is incorporated by reference in its entirety, as if set forth fully herein. Publication (1) describes learning a mapping from images to a Euclidean space where distances directly correspond to a measure of similarity. For training, triplets of aligned matching and non-matching patches are generated using a triplet mining method. Publication (2) describes a Mahalanobis metric (e.g., a global linear transformation of an input space preceding a k-nearest neighbor classification using Euclidean distances) trained with a goal in which k-nearest neighbors belong always to a same class, while those from different classes are separated by a large margin. Publication (3) describes learning a distance metric from relative comparisons such as "A is closer to B than to C".

An output 24 of the clustering component 22 represents a degree of similarity between the vectors 18 and 20, as determined by the component 22, wherein, in one example embodiment, lesser values of the output 24 are deemed to indicate a higher degree of similarity between the vectors 18 and 20 than do greater values. Each output 24 is provided to a confidence determination component 26, where it is determined in step 510 whether the value of the output 24 is less than or equal to a predetermined threshold, such as, by example and without limitation, 0.5. In one example embodiment, if the value of an individual output 24 is not less than or equal to the predetermined threshold ("No" in step 510), then the output 24 is discarded (step 514) and the method ends (step 516). If, on the other hand, the value of an individual output 24 is determined to be less than or equal to the predetermined threshold ("Yes" in step 510), then the component 26 selects the output 24 (step 518). Values no greater than the threshold are considered to be indicative of the corresponding vector 18 being substantially similar to the corresponding vector 20 to which it was compared by the clustering component 22, and the vector 18 is considered to belong to the same classification as the corresponding vector 20, with a predetermined confidence level. In such cases, the clustering component 22 provides an output 27 indicative that the input image 10 belongs to the classification to which the corresponding vector 20 belongs. As a result of the performance of steps 508 and/or 510, the vector 20 and classification thereof are identified as corresponding to the vector 18.

In one example embodiment, the confidence determination component 26 selects a predetermined number of the outputs 24 having values no greater than the threshold, ranks them and outputs them individually or collectively as output 27 (in step 518). For example, the component 26 ranks the values of output(s) 24 that are no greater than the threshold such that, lower values are ranked higher than lesser values, and selects K of the highest ranked values for being outputted as outputs 27 (in one example embodiment herein, this may be performed as described in publication (2) mentioned above). However, in other example embodiments herein, the component 26 does not select the top K results, and simply provides an output 27 corresponding to each output 24 received from the clustering component 22.

In one example embodiment herein, the output(s) 27 are provided to a user interface 28 for being presented to the user in step 520. As an example, the user interface 28 can display the output(s) 27, to indicate the determined classification(s) of the input image 10. By example, in a case where the input image 10 was cover art of the Abbey Road album, and was deemed to belong to the classification (by virtue of being substantially similar to a vector 20 of that classification) for that album by the clustering component 22, then the user interface 28 can indicate that classification. The user interface 28, in one example embodiment, includes an input user interface for enabling the user to enter commands, interact with presented content, and the like, and also includes an output user interface that enables the user to perceive outputted information. The interface 28 may include a display, microphone, speaker, keyboard, or any other type of input/output user interface. Also, although the interface 28 is shown as a singular interface 28 in FIG. 1, it should be appreciated that the interface 28 may include more than a single interface.

In one example embodiment herein, the user interface 28 can query the user as to whether the user wishes to access content relating to the presentation made in step 520 (e.g., an indication of the Abbey Road album), such as metadata 17 and/or one or more tracks 19 from the album. Then, in a case where, for example, the user operates the user interface 28 to specify that metadata 17 and/or one or more tracks 19 from the album should be accessed (step 522), the system 100 responds in step 524 by correlating the selection to corresponding metadata 17 and/or track(s) 19 of the album (e.g., stored in database 14, or elsewhere), and retrieving that content, and then, in step 526, by presenting it to the user by way of user interface 28. For example, in step 526 the user interface 28 can display the retrieved metadata 17, and/or play the retrieved track(s) 19 to the user (or enable the user to select the track(s) for being played to the user, in which case they are played). Thereafter, the procedure ends (step 516). In this manner, a user can be provided with metadata and/or musical tracks by inputting an image 10 to the system 100, relating thereto. This provides convenience for the user in that the user does not need to search manually through the database 14 for desired content such as metadata and/or tracks, relating to the captured image 10.

In another example where the component 26 provides (as outputs 27) the top K results based on the input image 10, those results can be presented/recommended to the user in step 526 via user interface 28. For example, the results may indicate that the image 10 correlated to one or more of K classes, such as K musical albums or musical genres. The user can then operate the user interface 28 to select one of the classes such that one more related musical tracks and/or metadata can be retrieved and perceived by the user.

In another example embodiment herein, the system 100 can present and/or recommend a track playlist to the user. For example, step 520 can include the system 100 presenting via user interface 28 a playlist recommendation relating to the result of step 508 (a playlist corresponding to the determined classification), in which case the user can select the playlist (step 522), and tracks from the playlist are retrieved (step 524) and presented to the user in the above-described manner (step 526). One example of the manner in which a playlist can be generated and accessed is described in U.S. Pat. No. 9,626,436, issued Apr. 18, 2017, by Roger et al., which is incorporated by reference herein in its entirety. For example, in one example embodiment herein, as described in U.S. Pat. No. 9,626,436, recommendation of a playlist involves an application programming interface (API) receiving a request to generate a playlist, where the request includes a set of rule-primitives. A playlist engine evaluator evaluates a rule corresponding to each rule-primitive in the set of rule-primitives across a catalog of media content, calculates a cost associated with each item in the catalog of media content, and generates a playlist based on the items of the catalog having the lowest costs.

In one example embodiment herein, the recommended playlist includes tracks relating to the selected classification, and other tracks. In still another example embodiment herein, metadata is retrieved and presented to the user, as well.

Content retrieved in step 425 and presented to the user in step 526 also can be saved by the user to, e.g., database 14 or memory 32, for later access, by virtue of the user operating the user interface 28 to specify that the content be saved, wherein in response thereto, the content is saved in the database 14 or memory 32. Also, the system has a capability for enabling the user to share content retrieved in step 524 and presented to the user in step 526. For example, in response to the user operating the user interface 28 to specify that content (e.g., a musical track and/or metadata) presented in step 625 be shared with another user identified by information inputted to the interface 28 by the user, the system 100 forwards the content to the other user.

Figure 6:
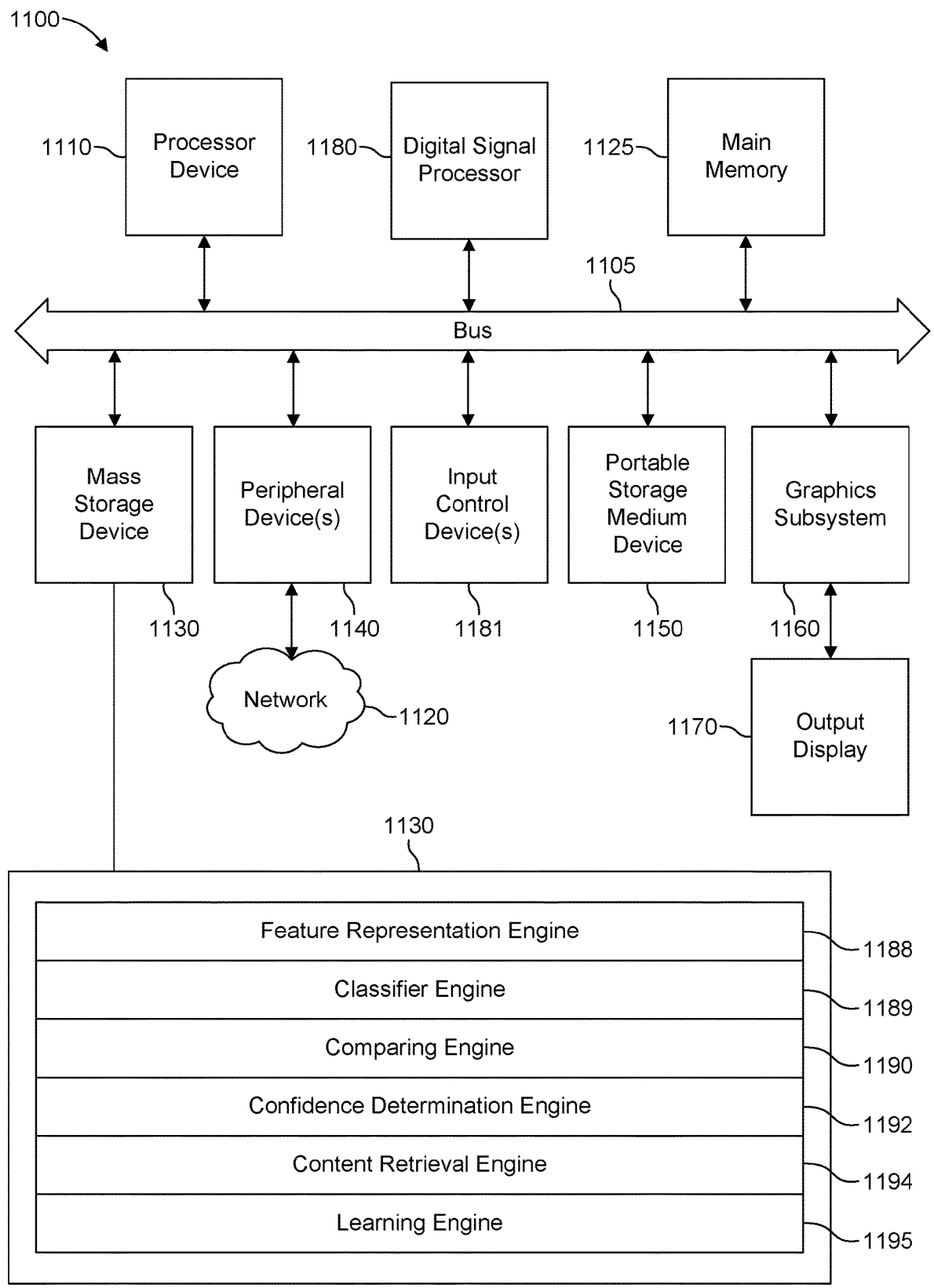
FIG. 6 is a block diagram showing an example computation system constructed to realize the functionality of the example embodiments described herein.

FIG. 6 is a block diagram showing an example computation system (also referred to herein as a "computer") 1100 constructed 1100 to realize the functionality of the example embodiments described herein. Computation system 1100 may include without limitation a processor device 1110 (which, in one example embodiment, further represents controller 30 of FIG. 1), a main memory 1125, and an interconnect bus 1105. The processor device 1110 may include without limitation a single microprocessor, or may include a plurality of microprocessors for configuring the system 1100 as a multiprocessor computation system. The main memory 1125 stores, among other things, instructions and/or data for execution by the processor device 1110. The main memory 1125 may include banks of dynamic random access memory (DRAM), as well as cache memory, and, in one example embodiment, further represents the memory 32 of FIG. 1 described above.

The system 1100 may further include a mass storage device 1130 (which, in one example embodiment, further represents database 14 of FIG. 1 described above), peripheral device(s) 1140, portable non-transitory storage medium device(s) 1150, input control device(s) 1181, a graphics subsystem 1160, and/or an output display interface (also referred to herein as "output display") 1170. A digital signal processor (DSP) 1180 may also be included to perform audio signal processing. For explanatory purposes, all components in the system 1100 are shown in FIG. 6 as being coupled via the bus 1105. However, the system 1100 is not so limited. Elements of the system 1100 may be coupled via one or more data transport means. For example, the processor device 1110, the digital signal processor 1180 and/or the main memory 1125 may be coupled via a local microprocessor bus. The mass storage device 1130, peripheral device(s) 1140, portable storage medium device(s) 1150, and/or graphics subsystem 1160 may be coupled via one or more input/output (I/O) buses. The mass storage device 1130 may be a nonvolatile storage device for storing data and/or instructions for use by the processor device 1110. The mass storage device 1130 may be implemented, for example, with a magnetic disk drive or an optical disk drive. In a software embodiment, the mass storage device 1130 is configured for loading contents of the mass storage device 1130 into the main memory 1125. Mass storage device 1130 additionally stores a feature representation engine 1188 for computing features such as vectors based on images, a learning/estimator engine 1195 for learning classifications of content such as images, a classifier engine 1189 for determining classifications for inputted images, a comparing engine 1190 for comparing feature vectors for similarity, a confidence determination engine 1192 for determining a confidence level for an output of the engine 1190 based on a predetermined threshold and a content retrieval engine 1194 for accessing content (e.g., metadata and/or musical tracks) based on a user command and/or an output of engine 1192.

The portable storage medium device 1150 operates in conjunction with a nonvolatile portable storage medium, such as, for example, a solid state drive (SSD), to input and output data and code to and from the system 1100. In some embodiments, the software for storing information may be stored on a portable storage medium, and may be inputted into the system 1100 via the portable storage medium device 1150. The peripheral device(s) 1140 may include any type of computer support device, such as, for example, an input/output (I/O) interface configured to add additional functionality to the system 1100. For example, the peripheral device(s) 1140 may include a network interface card for interfacing the system 1100 with a network 1120.

The input control device(s) 1181 provide a portion of the user interface for a user of the computer 1100. The input control device(s) 1181 (which may further represent user interface 28 of FIG. 1) may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the system 1100 may include the graphics subsystem 1160 and the output display 1170. The output display 1170 may include a display such as a CSTN (Color Super Twisted Nematic), TFT (Thin Film Transistor), TFD (Thin Film Diode), OLED (Organic Light-Emitting Diode), AMOLED display (Activematrix Organic Light-emitting Diode), and/or liquid crystal display (LCD)-type displays. The displays can also be touchscreen displays, such as capacitive and resistive-type touchscreen displays.

The graphics subsystem 1160 receives textual and graphical information, and processes the information for output to the output display 1170.

Input control devices 1181 can control the operation and various functions of system 1100.

Input control devices 1181 can include any components, circuitry, or logic operative to drive the functionality of system 1100. For example, input control device(s) 1181 can include one or more processors acting under the control of an application.

Each component of system 1100 may represent a broad category of a computer component of a general and/or special purpose computer. Components of the system 1100 are not limited to the specific implementations provided herein. The system 1100 may further represent the system 100 of FIG. 1, in one example embodiment. In one example embodiment, the system 1100 is any suitable type of media content access and/or player device, and may be included in a portable, hand-held configuration, a desktop configuration, or any other suitable type of configuration. As such, the user can employ the system 1100 to access desired content using any suitable type of media content device.

Software embodiments of the examples presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described herein.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIG. 6 is presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method comprising:
    comparing a query image classification of an image to a plurality of particular classifications of images stored in a database, each of the plurality of particular classifications stored in the database being associated with at least one corresponding image and each at least one corresponding image associated with one or more tracks;
    identifying two or more images of the database that correspond to the query image classification based on the comparing;
    selecting a plurality of tracks from the one or more tracks, wherein each of the one or more tracks is associated with at least one of the two or more images;
    presenting the plurality of tracks;
    receiving a selection of one of the plurality of tracks; and
    playing the selection.

2. The method of claim 1, wherein the comparing includes performing one of a nearest neighbor procedure, a vector space measurement, or a triplet loss function procedure.

3. The method of claim 1, further comprising generating a recommendation playlist based on a result of identifying the two or more images.

4. The method of claim 1, further comprising detecting a musical category based on the two or more images.

5. The method of claim 1, further comprising extracting feature vectors from a query image and a plurality of images stored in the database.

6. The method of claim 5, wherein the extracting is performed by one of a convolutional neural network and an autoencoder.

7. The method of claim 1, further comprising presenting at least one of the two or more images.

8. The method of claim 1, further comprising identifying metadata that corresponds to the two or more images identified by the identifying.

9. The method of claim 1, further comprising training a classifier based on images stored in the database.

10. The method of claim 9, wherein the training trains the classifier to classify at least some of the images from the database into predetermined classifications.

11. A system, comprising:
    a memory storing a program; and
    a computer processor, operating under control of the program, configured to:
        compare a query image classification of an image to a plurality of particular classifications of images stored in a database, each of the plurality of particular classifications stored in the database being associated with at least one corresponding image and each at least one corresponding image associated with one or more tracks;
        identify two or more images of the database that correspond to the query image classification based on the comparison;
        select a plurality of tracks from the one or more tracks, wherein each of the one or more tracks is associated with at least of one of the two or more images;
        present the plurality of tracks;
        receive a selection of one of the plurality of tracks; and
        play the selection.

12. The system of claim 11, the computer processor, operating under control of the program, further configured to:
    perform the comparison by using one of a nearest neighbor procedure, a vector space measurement, or a triplet loss function procedure.

13. The system of claim 11, the computer processor, operating under control of the program, further configured to:
    generate a recommendation playlist based on a result of identification of the two or more images.

14. The system of claim 11, the computer processor, operating under control of the program, further configured to:
    detect a musical category based on the two or more images.

15. The system of claim 11, the computer processor, operating under control of the program, further configured to:
    extract feature vectors from a query image and a plurality of images stored in the database.

16. The system of claim 15, the computer processor, operating under control of the program, further configured to:
    perform the extraction using one of a convolutional neural network and an autoencoder.

17. The system of claim 11, the computer processor, operating under control of the program, further configured to:
    present at least one of the two or more images.

18. The system of claim 11, the computer processor, operating under control of the program, further configured to:
    identify metadata that corresponds to the two or more images identified by the identifying.

19. The system of claim 11, the computer processor, operating under control of the program, further configured to:
    train a classifier based on images stored in the database.

20. The system of claim 19, the computer processor, operating under control of the program, further configured to:
    train the classifier to classify at least some of the images from the database into predetermined classifications.

21. A non-transitory computer-readable memory storing a program which, when executed by at least one computer processor, causes the at least one computer processor to perform:
    comparing a query image classification of an image to a plurality of particular classifications of images stored in a database, each of the plurality of particular classifications stored in the database being associated with at least one corresponding image and each at least one corresponding image associated with one or more tracks;
    identifying two or more images of the database that correspond to the query image classification based on the comparing;

selecting a plurality of tracks from the one or more tracks, wherein each of the one or more tracks is associated with at least one of the two or more images;
presenting the plurality of tracks;
receiving a selection of one of the plurality of tracks; and
playing the selection.

\* \* \* \* \*